(12) United States Patent
Arold

(10) Patent No.: US 6,761,210 B1
(45) Date of Patent: Jul. 13, 2004

(54) AIRCONDITIONER FOR A PASSENGER CELL OF A VEHICLE

(75) Inventor: Klaus Arold, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/561,906

(22) Filed: May 1, 2000

(30) Foreign Application Priority Data

Apr. 30, 1999 (DE) .......................................... 199 19 975

(51) Int. Cl.$^7$ .............................................. B60H 1/00
(52) U.S. Cl. ........................... 165/43; 165/42; 165/203; 454/156; 454/160; 454/161; 237/12.3 A; 237/12.3 B
(58) Field of Search ........................... 165/42, 43, 203; 237/12.3 A, 12.3 B; 454/156, 160, 161

(56) References Cited

U.S. PATENT DOCUMENTS

| 4,383,642 A | | 5/1983 | Sumikawa et al. |
| 5,014,911 A | * | 5/1991 | Vincent ................. 237/12.3 A |
| 5,862,677 A | * | 1/1999 | Kim et al. ..................... 165/42 |
| 5,878,806 A | * | 3/1999 | Denk et al. .................... 165/43 |
| 6,206,092 B1 | * | 3/2001 | Beck et al. .................... 165/43 |

FOREIGN PATENT DOCUMENTS

| DE | 4000990 | * | 7/1991 |
| DE | 4119474 | | 12/1992 |
| DE | 19750381 | | 5/1998 |
| DE | 197 50 381 | | 5/1998 |
| EP | 0893292 | | 1/1999 |
| GB | 2 336 204 | | 10/1999 |
| JP | 58-136813 | * | 9/1983 |
| WO | WO 96/29211 | * | 9/1996 |

* cited by examiner

Primary Examiner—John K. Ford
(74) Attorney, Agent, or Firm—Crowell & Moring LLP

(57) ABSTRACT

An air-conditioning system for a passenger cell of a vehicle includes an evaporator, for cooling an air stream, arranged in succession with a heat exchanger for heating the air stream. The heat exchanger has a heating medium flowing through it permanently. At least one air-mixing space is directly adjacent to the heat exchanger and has a warm-air inlet, covering at least part of the air outlet surface of the heat exchanger, and a cold-air inlet, forming the mouth of a cold-air duct bypassing the heat exchanger. Control members set the opening cross sections of the inlets. For the purpose of a substantial reduction in cold-air heating in the "maximum cooling" operating mode by the heat exchanger through which the heating medium flows permanently, an air-guide flap pivotable into two pivoting end positions is arranged at the inlet of the cold-air duct on the air inlet side of the heat exchanger, in such a way that, in this operating mode, the said air-guide flap covers a part region of the air inlet surface of the heat exchanger and performs an air-guide function for guiding the cold-air stream towards the cold-air duct inlet.

22 Claims, 1 Drawing Sheet

AIRCONDITIONER FOR A PASSENGER CELL OF A VEHICLE

BACKGROUND AND SUMMARY OF THE INVENTION

This application claims the priority of German Patent Document 199 19 975.2, filed Apr. 30, 1999, the disclosure of which is expressly incorporated by reference herein.

The invention relates to an air-conditioning system for a passenger cell of a vehicle of the type comprising:

an evaporator arrangement in an air stream,
a heat exchanger for heating the air stream, said heat exchanger being arranged downstream of the evaporator and having a heating medium flowing through it permanently,
at least one air-mixing space which is directly adjacent to an air outlet side of the heat exchanger and which has a warm-air inlet covering at least part of an air outlet surface of the heat exchanger and a cold-air inlet forming a mouth of a cold-air duct bypassing the heat exchanger,
a warm-air control member setting the opening cross section of the warm-air inlet and
a cold-air control member setting the opening cross section of the cold-air inlet.

A known air-conditioning system of this type (German Patent Document DE 197 50 381 A1) regulated on the air side or free of any heating valve has a heat exchanger which extends in the vertical direction of the vehicle and over the top side of which the cold-air duct is led to the air-mixing space. In this type of air-conditioning system, because a controlled valve in the circuit of the heating medium is dispensed with, heating medium circulates through the heat exchanger even when the "maximum cooling" operating mode, in which the passenger cell is to be supplied with maximum cooling air, is switched on. For the purpose of a compact design of the air-conditioning system, the evaporator and heat exchanger are arranged closely adjacent to one another, and, for reasons of space, the air-mixing flaps for the supply of warm air and cold air are shifted into the air-mixing space, the warm-air flaps consequently being arranged on the air outlet side of the heat exchanger. In the "maximum cooling" operating mode, therefore, the cold-air stream which flows along the heat exchanger front side facing the evaporator and enters the cold-air duct is unavoidably heated by the heat radiation from the heat exchanger.

In order to reduce this heating, in the known air-conditioning system mentioned above an umbrella-like or diaphragm-like guide is provided, which, starting from the upper end of the heat exchanger, projects downwards and diagonally in the direction of the evaporator on the front side of the heat exchanger. This umbrella-like guide prevents the air heated in the heat exchanger from rising and passing into the cold-air duct.

An object on which the invention is based is to improve an air-conditioning system of the type mentioned in the introduction in terms of a further reduction in cold-air heating in the "maximum cooling" operating mode.

The object is achieved according to the invention, by providing an arrangement of the above-noted type wherein an air-guide flap pivotable into two pivoting end positions is arranged at an inlet of the cold-air duct on the air inlet side of the heat exchanger facing the evaporator, in such a way that, in a first pivoting end position assumed in a "maximum cooling" operating mode, the air-guide flap covers only a part region of the air inlet surface of the heat exchanger and assumes an orientation in which it diverts the air stream towards the inlet of the cold-air duct.

The advantage of the air-conditioning system according to the invention is that, in the "maximum cooling" operating mode, the air inlet surface of the heat exchanger through which the heating medium flows is partially covered by the pivotable air-guide flap on the heat exchanger front side or cold-air side facing the evaporator, as a result of which, in conjunction with the closed warm-air control member on the air outlet side of the heat exchanger, a build-up of air is formed in the heat exchanger and assists the air-guide function of the air-guide flap arising due to the orientation of the latter, specifically the function of guiding the cold-air stream directly to the inlet of the cold-air duct. At the same time, the orientation of the air-guide flap prevents parts of the air cushion formed by this air build-up from being entrained by the cold-air stream and the air in the air cushion from being exchanged. The heating of the cold air by means of the heat exchanger is consequently reduced to a minimum. In the "maximum heating" operating mode, the air-guide flap is pivoted away from the heat exchanger into the inlet region of the cold-air duct, so that the maximum air inlet surface of the heat exchanger is available unrestrictedly for the passage of air.

Advantageous embodiments of the air-conditioning system according to the invention, along with expedient developments and refinements of the invention, are specified herein and in the claims.

According to an advantageous embodiment of the invention, the air-guide flap, when in its second pivoting end position assumed in the "maximum heating" operating mode, at least partially covers the inlet region of the cold-air duct and assumes an orientation in which it diverts the air stream towards the air inlet surface of the heat exchanger. This outward pivoting and orientation of the air-guide flap contributes, in the "maximum heating" operating mode, to an improved air flow within the heat exchanger region adjacent to the cold-air duct and reduces the flow resistances at the heat exchanger inlet.

Other objects, advantages and novel features of the present invention will become apparent from the following detailed description of the invention when considered in conjunction with the accompanying drawings.

DETAILED DESCRIPTION OF THE DRAWINGS

Figure 1:
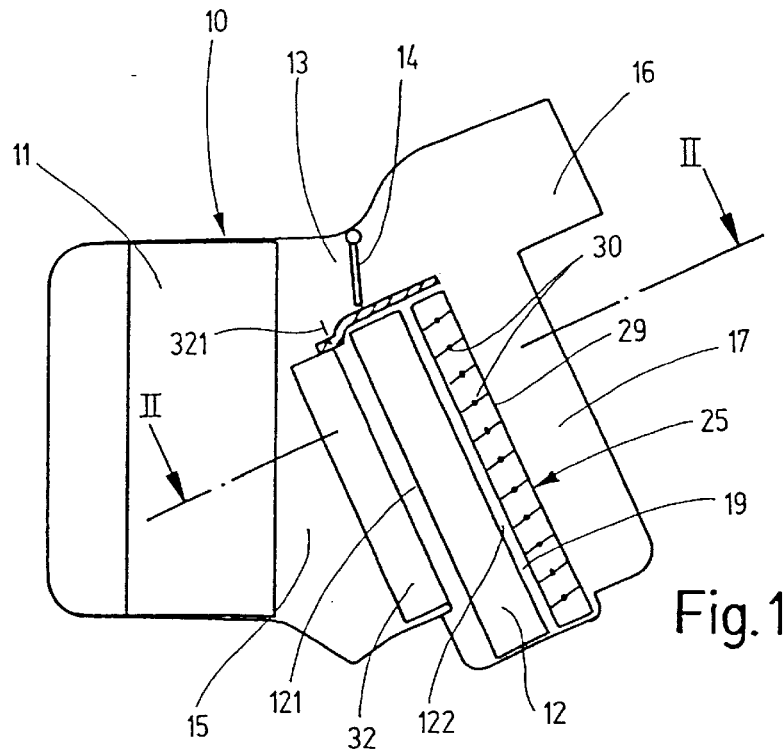
FIG. 1 shows a longitudinal section along the line I—I in FIG. 2 of an air-conditioning system for a passenger car, constructed according to a preferred embodiment with the present invention.

The air-conditioning system, illustrated in FIG. 1, for the air-conditioning of the passenger cell of a passenger car, as an exemplary embodiment of a general vehicle, has an air-conditioning box 10, into which an air stream can be blown by means of a blower, not illustrated here, and in the air-conditioning box 10 flows in succession through an evaporator 11 for cooling the air stream and a heat exchanger 12 for heating the air stream. The evaporator 11, which is tied in a known way in the refrigerant circuit of a refrigerating system, covers the entire clear cross section of the air-conditioning box 10. The heat exchanger 12, arranged so as to be closely adjacent to the evaporator 11 downstream of the latter, has a heating medium, in general the cooling water of the internal combustion engine of the vehicle, flowing permanently or continuously through it, specifically regardless of the respective operating mode of the air-conditioning system.

A bypass 13 controlled by a bypass flap 14 is provided on the top side of the heat exchanger. Depending on the position of the bypass flap 14, a greater or lesser quantity of cold air is supplied from the interspace 15 between the evaporator 11 and heat exchanger 12 directly to an air duct 16 which can be connected to an air outlet nozzle arranged in the dashboard of the passenger cell.

Figure 2:
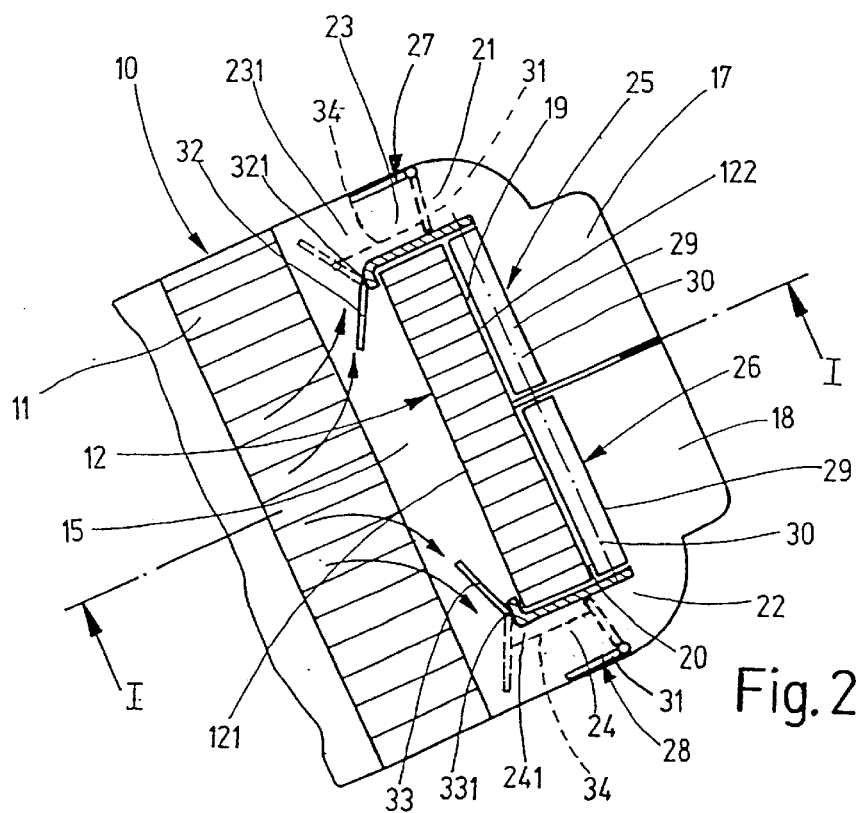
FIG. 2 shows a section along the line II—II in FIG. 1.

In the exemplary embodiment, shown in FIGS. 1 and 2, of an air-conditioning system, by means of which separate air-conditioning of the left-hand and right-hand half of the passenger cell, that is to say the driver's side and the front-seat passenger's side, is to become possible, two air ducts 16 are provided, which are connected in each case to one of two middle nozzles arranged next to one another in the dashboard. Moreover, each air duct 16 is connected to the outlet of one of two air-mixing spaces 17, 18 formed next to one another in the air-conditioning box 10 directly downstream of the heat exchanger 12 in the air flow direction. Each air-mixing space 17 and 18 has a warm-air inlet 19 and 20 and a cold-air inlet 21 and 22. Each warm-air inlet 19 and 20 covers half the air outlet surface 122 of the heat exchanger 12, and each cold-air inlet 21 and 22 has opening into it a cold-air duct 23, 24 which is led laterally past the heat exchanger 12 into the interspace 15. Each warm-air inlet 19 and 20 is provided with a warm-air control member 25 and 26 and each cold-air inlet 21 and 22 is provided with a cold-air control member 27 and 28, the said control members controlling the opening cross section of the respective inlets 19–22. At the same time, each warm-air control member 25 and 26 is designed as a blind shutter 29 which saves construction space and which has a plurality of jointly pivoted pivoting slats 30 which are arranged equidistantly next to one another directly at the air outlet surface 122 of the heat exchanger 12 and which, when the blind shutter 29 is in the closed position, overlap one another and thus close the entire air outlet surface 122 of the heat exchanger 12.

Each cold-air control member 27 and 28 is formed by a pivoting flap 31 which, in the exemplary embodiment, is arranged in the associated cold-air duct 23 and 24 and, when in one of its pivoting end positions, closes the duct cross section (illustrated by dashes in FIG. 2) and, in its other pivoting end position, completely opens the said duct cross section (illustrated by unbroken lines in FIG. 2). In the "maximum heating" operating mode of the air-conditioning system, the cold-air control members 27, 28 are closed and the warm-air control members 25, 26 are opened to the maximum. In the "maximum cooling" operating mode, the warm-air control members 25, 26 are closed completely and the cold-air control members 27, 28 are opened to the maximum.

Since the heating medium flows permanently through the heat exchanger 12, even in the "maximum cooling" operating mode, the air flowing along on the front side of the heat exchanger 12 towards the inlets 231 and 241 of the cold-air ducts 23, 24 is unavoidably heated. In order to reduce such heating of the cooling-air stream to a still acceptable minimum, two air-guide flaps 32, 33 are arranged at the inlet 231 and 241 of the air duct 23 and 24 on the front side or air inlet side, facing the evaporator 11, of the heat exchanger 12, the pivot axis 321 and 331 of said air-guide flaps running along the inner boundary wall of the cold-air ducts 23 and 24 in a vertical plane parallel to the heat exchanger 12. Each air-guide flap 32 and 33 is pivotable into two pivoting end positions and, at the same time, is designed in such a way that, in its first pivoting end position assumed in the "maximum cooling" operating mode, it covers only a part region of the air inlet surface 121 of the heat exchanger 12 and assumes an orientation in which it diverts the air stream to the inlet 231 and 241 of the cold-air ducts 23 and 24.

This first pivoting end position of the air-guide flaps 32, 33 is illustrated by unbroken lines in FIG. 2. By contrast, in its other pivoting end position, which the air-guide flap 32 and 33 assumes in the "maximum heating" operating mode, the air inlet surface 121 of the heat exchanger 12 is opened completely and the inlet 231 and 241 of the respective cold-air ducts 23 and 24 is at least partially covered, the air-guide flap 32 having an orientation such that the air flowing through the evaporator 13 near the wall region is diverted towards the heat exchanger 12. Consequently, in the "maximum heating" operating mode, the air inlet surface 121 of the heat exchanger 12 is fully opened again and, moreover, due to vortex formations being avoided in the inlet region of the cold-air ducts 23, 24, the flow resistance of the air within the air-conditioning box 10 is reduced.

As also indicated in FIG. 2 by dashes, the air-guide flaps 32, 33 are coupled mechanically to the cold-air control member 27 and 28 and are transferred into the respective end position during the opening and closing of the cold-air control members 27, 28. FIG. 1 illustrates the position of the control members 25 and 27 and of the air-guide flap 32 in the "maximum heating" operating mode, and FIG. 2 illustrates the position of the control members 25, 26 and 27, 28 and of the air-guide flaps 32, 33 by unbroken lines in the "maximum cooling" operating mode and by dashes in the "maximum heating" operating mode.

The invention is not restricted to the exemplary embodiment described above. If there is no need for separate air-conditioning of the driver's side and front-seat passenger's side in the passenger cell, one of the air ducts 16 and of the air-mixing spaces 17 and 18 is dispensed with. The remaining air-mixing space 17 or 18 then extends over the entire air outlet surface 122 of the heat exchanger 12. There is only one air-mixing space outlet, warm-air inlet, cold-air inlet and cold-air duct in each case. There is likewise only a single warm-air control member, a single cold-air control member and a single air-guide flap.

Mechanical coupling between the air-guide flaps 32, 33 and the cold-air control members 27, 28 may also be replaced by electrical coupling. The pivoting movement of the air-guide flaps 32, 33 out of the "maximum cooling" operating mode into the "maximum heating" operating mode, and vice versa, may also be derived from the actuation of the warm-air control members 25, 26 which are preferably coupled to the cold-air control members 27, 28.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air-conditioning system for a, passenger cell of a vehicle, comprising:
   an evaporator arranged in an air stream, for cooling the air stream,
   a heat exchanger for heating the air stream, said heat exchanger being arranged downstream of the evaporator and having a heating medium flowing through it permanently, an air-mixing space which is directly adjacent to an air outlet side of the heat exchanger and which has a warm-air inlet into the air mix space, the warm-air inlet covering at least part of an air outlet surface of the heat exchanger and a cold-air inlet forming a mouth of a cold-air duct bypassing the heat exchanger, a warm-air control member setting the opening cross section of the warm-air inlet and a cold-air control member setting the opening cross section of the cold-air inlet, wherein an air-guide flap pivotable into two pivoting end positions is arranged at an inlet of the cold-air duct on the air inlet side of the heat exchanger facing the evaporator, in such a way that, in a first pivoting end position assumed in a "maximum cooling" operating mode, the air-guide flap covers only a part region of the air inlet surface of the heat exchanger and assumes an angular orientation relative to the hear exchanger, in which orientation it diverts the air stream towards the inlet of the cold-air duct.

2. Air-conditioning system according to claim 1, wherein, in its second pivoting end position assumed in a "maximum heating" operating mode, the air-guide flap at least partially covers the inlet region of the cold-air duct and assumes an orientation in which it diverts the air stream towards the air inlet surface of the heat exchanger.

3. Air-conditioning system according to claim 1, wherein the pivot axis of the air-guide flap is arranged along an inner boundary wall of the cold-air duct in the cold-air duct inlet.

4. Air-conditioning system according to claim 2, wherein the pivot axis of the air-guide flap is arranged along an inner boundary wall of the cold-air duct in the cold-air duct inlet.

5. Air-conditioning system according to claim 1, wherein, in the "maximum cooling" operating mode, the warm-air inlet of the air-mixing space is closed completely and the cold-air inlet of the air-mixing space is opened completely, and wherein, in a "maximum heating" operating mode, the warm-air inlet of the air-mixing space is opened completely and the cold-air inlet of the air-mixing space is closed completely.

6. Air-conditioning system according to claim 2, wherein, in the "maximum cooling" operating mode, the warm-air inlet of the air-mixing space is closed completely and the cold-air inlet of the air-mixing space is opened completely, and wherein, in a "maximum heating" operating mode, the warm-air inlet of the air-mixing space is opened completely and the cold-air inlet of the air-mixing space is closed completely.

7. Air-conditioning system according to claim 3, wherein, in the "maximum cooling" operating mode, the warm-air inlet of the air-mixing space is closed completely and the cold-air inlet of the air-mixing space is opened completely, and wherein, in a "maximum heating" operating mode, the warm-air inlet of the air-mixing space is opened completely and the cold-air inlet of the air-mixing space is closed completely.

8. Air-conditioning system according to claim 1, wherein the cold-air control member includes a pivoting flap arranged in the cold-air duct.

9. Air-conditioning system according to claim 2, wherein the cold-air control member includes a, pivoting flap arranged in the cold-air duct.

10. Air-conditioning system according to claim 5, wherein the cold-air control member includes a pivoting flap arranged in the cold-air duct.

11. Air-conditioning system according to claim 1, wherein the warm air control member includes a blind shutter arranged directly at the air outlet surface of the heat exchanger and has a plurality of jointly pivoted pivoting slats which are arranged equidistantly next to one another and which, when the blind shutter is in the closed position, overlap one another.

12. Air-conditioning system according to claim 2, wherein the warm air control member includes a blind shutter arranged directly at the air outlet surface of the heat exchanger and has a plurality of jointly pivoted pivoting slats which are arranged equidistantly next to one another and which, when the blind shutter is in the closed position, overlap one another.

13. Air-conditioning system according to claim 5, wherein the warm air control member includes a blind shutter arranged directly at the air outlet surface of the heat exchanger and has a plurality of jointly pivoted pivoting slats which are arranged equidistantly next to one another and which, when the blind shutter is in the closed position, overlap one another.

14. Air-conditioning system according to claim 1, wherein, for the separate air-conditioning of left-hand and right-hand sides of the passenger cell, two air-mixing spaces are provided, the warm-air inlet of which in each case covers half the air outlet surface of the heat exchanger and the cold-air inlet of which in each case forms the mouth of a cold-air duct led laterally around the heat exchanger on the left and right, and wherein an air-guide flap is arranged at each cold-air inlet.

15. Air-conditioning system according to claim 2, wherein, for the separate air-conditioning of left-hand and right-hand sides of the passenger cell, two air-mixing spaces are provided, the warm-air inlet of which in each case covers half the air outlet surface of the heat exchanger and the cold-air inlet of which in each case forms the mouth of a cold-air duct led laterally around the heat exchanger on the left and right, and wherein an air-guide flap is arranged at each cold-air inlet.

16. Air-conditioning system according to claim 5, wherein, for the separate air-conditioning of left-hand and right-hand sides of the passenger cell, two air-mixing spaces are provided, the warm-air inlet of which in each case covers half the air outlet surface of the heat exchanger and the cold-air inlet of which in each case forms the mouth of a cold-air duct led laterally around the heat exchanger on the left and right, and wherein an air-guide flap is arranged at each cold-air inlet.

17. Air-conditioning system for a passenger cell of a vehicle, comprising:

an evaporator arranged in an air stream, for cooling the air stream, a heat exchanger for heating the air stream, said heat exchanger being arranged downstream of the evaporator and having a heating medium flowing through it permanently, an air-mixing space which is directly adjacent to an air outlet side of the heat exchanger and which has a warm-air inlet into the air mix space, the warm-air inlet covering at least part of an air outlet surface of the heat exchanger and a cold-air inlet forming a mouth of a cold-air duct bypassing the heat exchanger, a warm-air control member setting the opening cross section of the warm-air inlet, a cold-air control member setting the opening cross section of the cold-air inlet, wherein an air-guide flap pivotable into two pivoting end positions is arranged at an inlet of the cold-air duct on the air inlet side of the heat exchanger facing the evaporator, in such a way that, in a first pivoting end position assumed in a "maximum cooling" operating mode, the air-guide flap covers only a part region of the air inlet surface of the heat exchanger and assumes an angular orientation relative to the heat exchanger, in which orientation it diverts the air stream towards the inlet of the cold-air duct, wherein, in the "maximum cooling" operating mode, the warm-air inlet of the air-mixing space is closed completely and the cold-air inlet of the air-mixing space is opened completely, wherein, in a "maximum heating" operating mode, the warm-air inlet of the air-mixing space is opened completely and the cold-air inlet of the air-mixing space is closed completely, and wherein the air-guide flap is coupled electrically to at least one of the control members for the warm-air and cold-air inlet of the air-mixing space, in such a way that the pivoting movement of the said air-guide flap is derived from the adjusting movement of the control member.

18. Air-conditioning system for a passenger cell of a vehicle, comprising:

a heat exchanger for heating the air stream, said heat exchanger having a heating medium flowing through it permanently, an air-mixing space which is directly adjacent to an air outlet side of the heat exchanger and which has a warm-air inlet into the air mix space, the warm-air inlet covering at least part of an air outlet surface of the heat exchanger and a cold-air inlet forming a mouth of a cold-air duct bypassing the heat exchanger, a warm-air control member setting the opening cross section of the warm-air inlet and a cold-air control member setting the opening cross section of the cold-air inlet, wherein an air-guide flap pivotable into two pivoting end positions is arranged at an inlet of the cold-air duct on the air inlet side of the heat exchanger, in such a way that, in a first pivoting end position assumed in a "maximum cooling" operating mode, the air-guide flap covers only a part region of the air inlet surface of the heat exchanger and assumes an angular orientation relative to the heat exchanger, in which orientation it diverts the air stream towards the inlet of the cold-air duct.

19. An assembly according to claim 18, wherein said air guide flap is movable to a position corresponding to maximum heating operations where it covers at least part of the inlet to the cold air duct and diverts air toward the inlet end of the heat exchanger.

20. An assembly according to claim 18, wherein the air guide flap is a pivotal flap member.

21. Air-conditioning system for a passenger cell of a vehicle, comprising:

a heat exchanger for heating the air stream, said heat exchanger having a heating medium flowing through it permanently, an air-mixing space which is directly adjacent to an air outlet side of the heat exchanger and which has a warm-air inlet into the air mix space, the warm-air inlet covering at least part of an air outlet surface of the heat exchanger and a cold-air inlet forming a mouth of a cold-air duct bypassing the heat exchanger, a warm-air control member setting the opening cross section of the warm-air inlet, a cold-air control member setting the opening cross section of the cold-air inlet, wherein an air-guide flap pivotable into two pivoting, end positions is arranged at an inlet of the cold-air duct on the air inlet side of the heat exchanger, in such a way that, in a first pivoting end position assumed in a "maximum cooling" operating mode, the air-guide flap covers only a part region of the air inlet surface of the heat exchanger and assumes an angular orientation relative to the heat exchanger, in which orientation it diverts the air stream towards the inlet of the cold-air duct, wherein, in the "maximum cooling" operating mode, the warm-air inlet of the air-mixing space is closed completely and the cold-air inlet of the air-mixing space is opened completely, wherein, in a "maximum heating" operating mode, the warm-air inlet of the air-mixing space is opened completely and the cold-air inlet of the air-mixing space is closed completely, and wherein the air-guide flap is coupled mechanically to at least one of the control members for the warm-air and cold-air inlet of the air-mixing space, in such a way that the pivoting movement of the said air-guide flap is derived from the adjusting movement of the control member.

22. Air-conditioning system for a passenger cell of a vehicle, comprising:

a heat exchanger for heating the air stream, said heat exchanger having a heating medium flowing through it permanently, an air-mixing space which is directly adjacent to an air outlet side of the heat exchanger and which has a warm-air inlet into the air mix space, the warm-air inlet covering at least part of an air outlet surface of the heat exchanger and a cold-air inlet forming a mouth of a cold-air duct bypassing the heat exchanger, a warm-air control member setting the opening cross section of the warm-air inlet, a cold-air control member setting the opening cross section of the cold-air inlet, wherein an air-guide flap pivotable into two pivoting end positions is arranged at an inlet of the cold-air duct on the air inlet side of the heat exchanger, in such a way that, in a first pivoting end position assumed in a "maximum cooling" operating mode, the air-guide flap covers only a part region of the air inlet surface of the heat exchanger and assumes an angular orientation relative to the heat exchanger, in which orientation it diverts the air stream towards the inlet of the cold-air duct, and wherein in the first pivoting end position, the air-guide flap covers only a part region of the air inlet surface of the heat exchanger such that a substantial portion of the air inlet surface of the heat exchanger is open to flow.

* * * * *